Patented Dec. 18, 1951

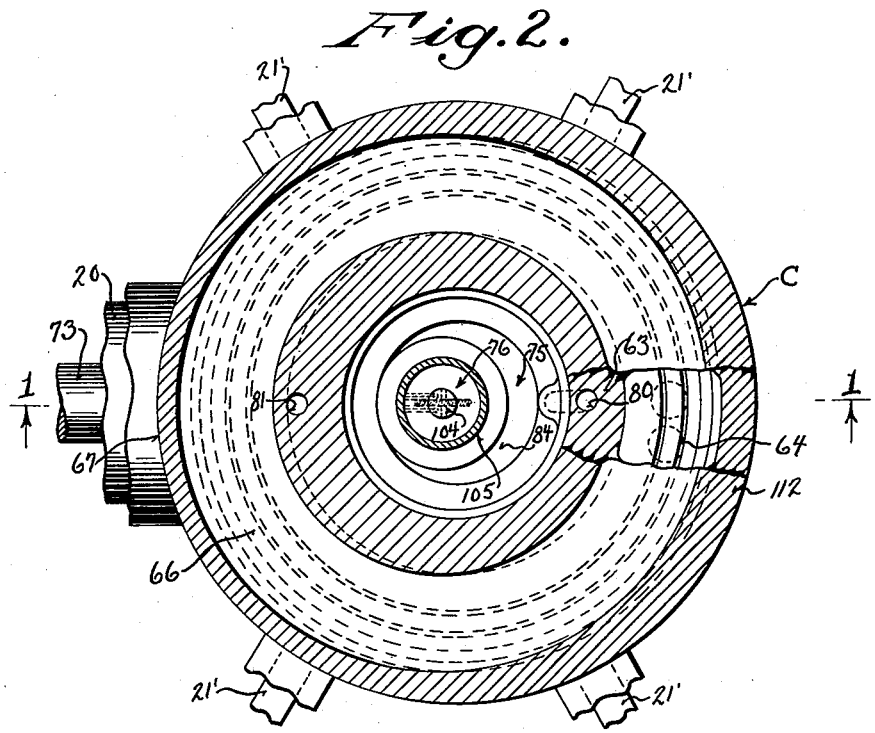
Fig. 2.
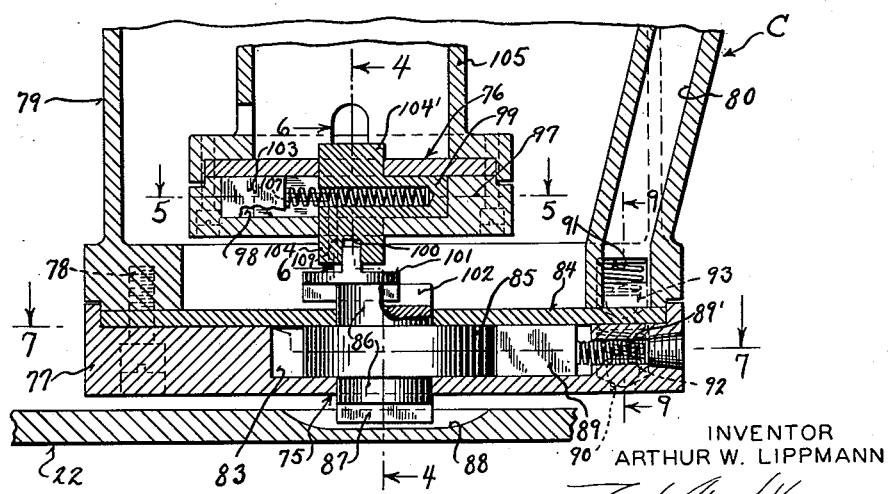
Fig. 3.
INVENTOR
ARTHUR W. LIPPMANN
BY 
ATTORNEYS Dec. 18, 1951 A. W. LIPPMANN 2,579,238
GYRATORY CRUSHER
Filed April 28, 1948 5 Sheets-Sheet 3
Fig. 4.
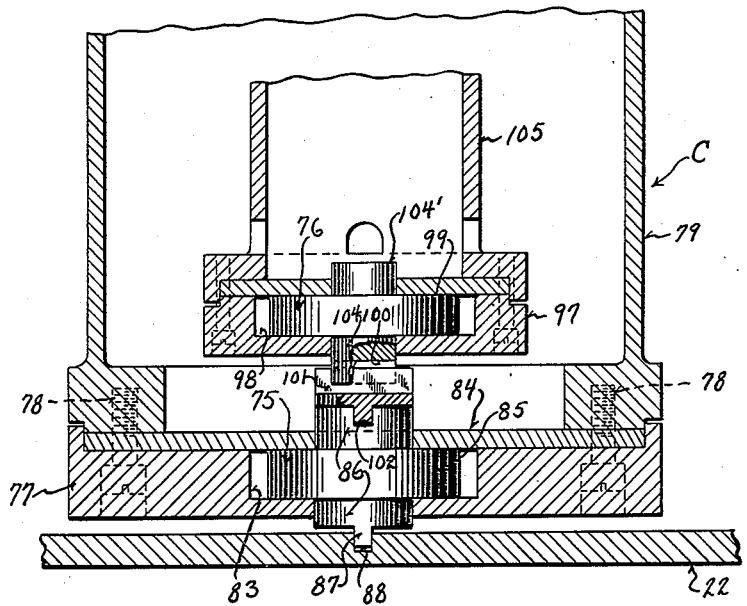
Fig. 5.
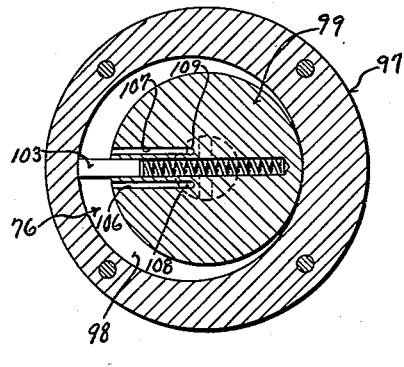
Fig. 6.
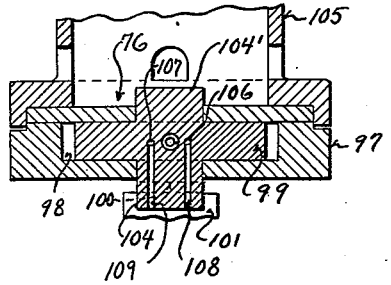
INVENTOR
ARTHUR W. LIPPMANN
BY 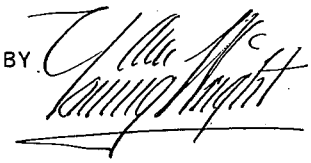
ATTORNEYS Dec. 18, 1951 — A. W. LIPPMANN — 2,579,238
GYRATORY CRUSHER
Filed April 28, 1948 — 5 Sheets-Sheet 4
*Fig. 7.*
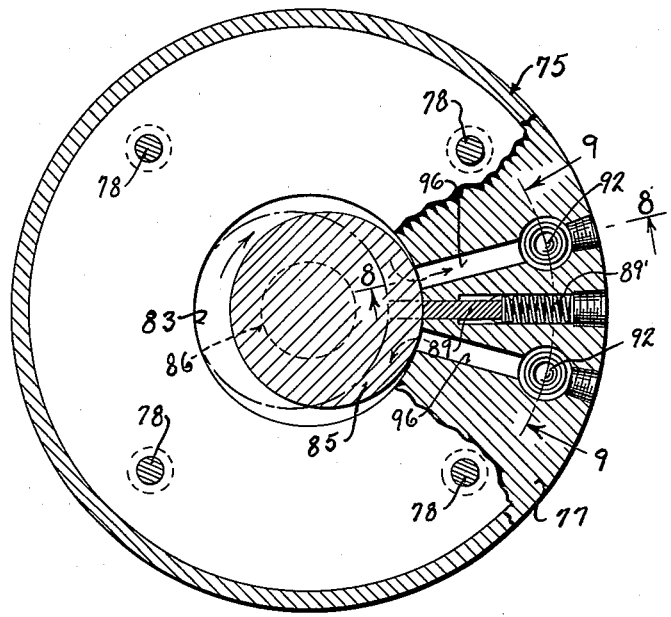
*Fig. 8.*
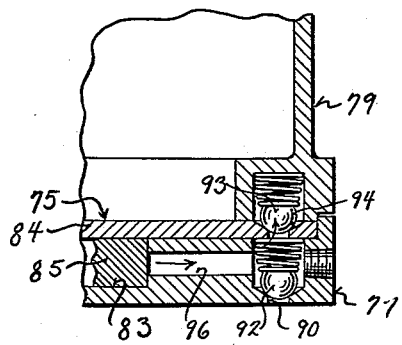
*Fig. 9.*
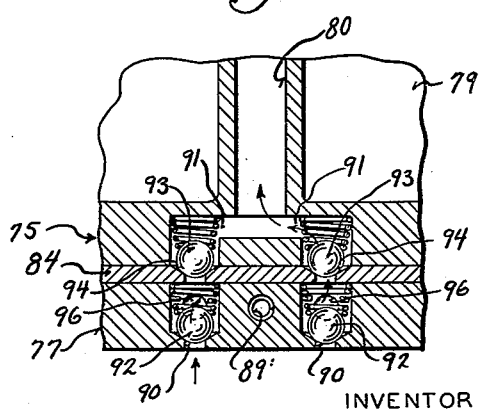
INVENTOR
ARTHUR W. LIPPMANN
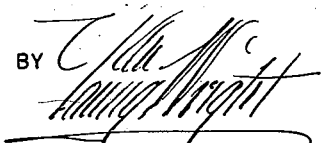
ATTORNEYS Dec. 18, 1951 — A. W. LIPPMANN — 2,579,238
GYRATORY CRUSHER
Filed April 28, 1948 — 5 Sheets-Sheet 5
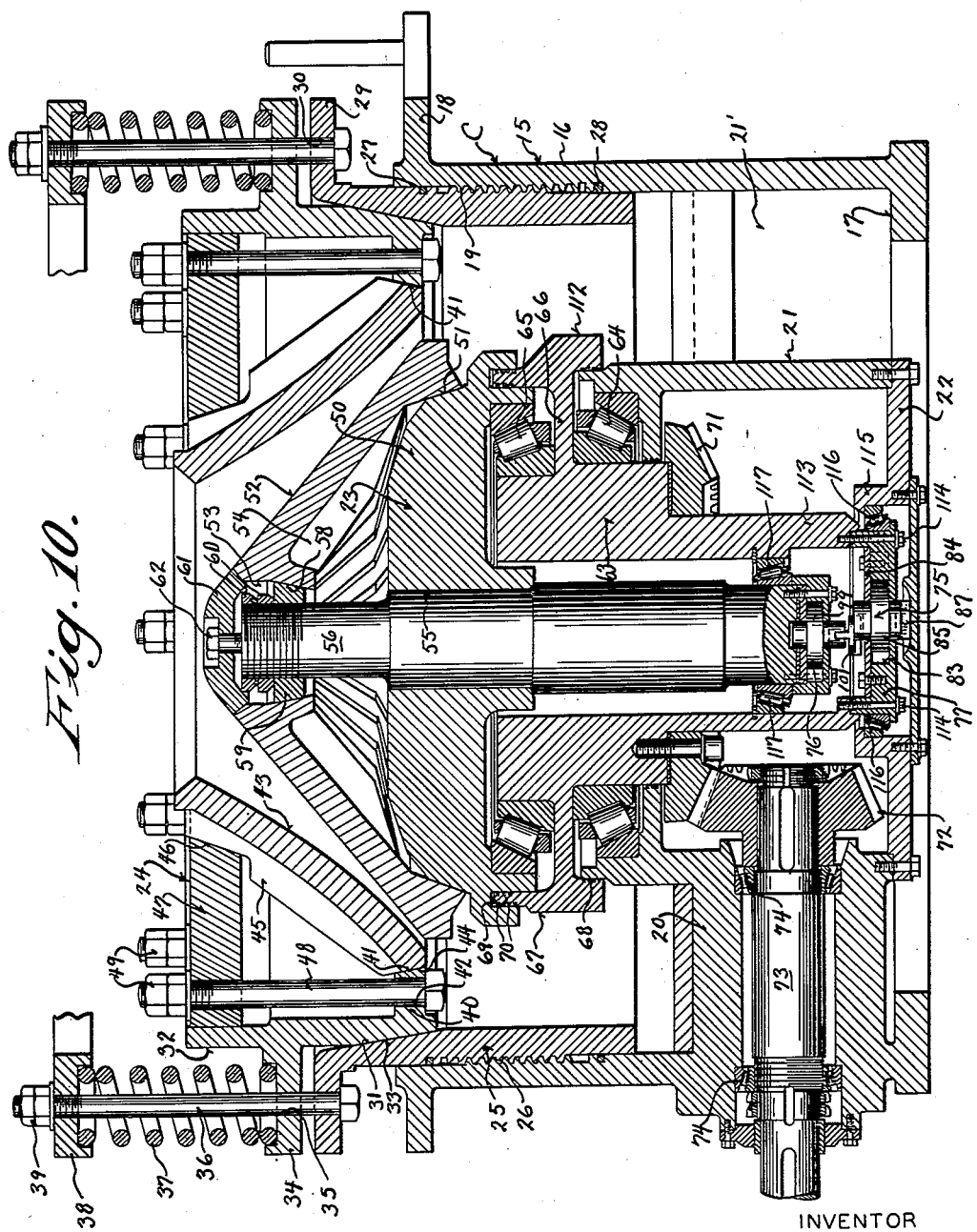
Fig. 10.
INVENTOR
ARTHUR W. LIPPMANN
ATTORNEYS

2,579,238

UNITED STATES PATENT OFFICE 2,579,238

GYRATORY CRUSHER

Arthur W. Lippmann, Milwaukee, Wis., assignor to Lippmann Engineering Works, Milwaukee, Wis., a partnership Application April 28, 1948, Serial No. 23,799

9 Claims. (Cl. 241—215)

This invention appertains to rock crushers, and more particularly to gyratory crushers of the shaftless type.

One of the primary objects of my invention is to provide a gyratory crusher which is so-constructed that its height and weight is reduced to a minimum, so that the same can be conveniently moved from place to place.

Another salient object of the invention is to provide a gyratory crusher of exceptionally rugged construction for its height and weight and which will have a large capacity for the continuous crushing of rock.

A further object of my invention is to provide novel means for gyrating the crushing head relative to the bowl, whereby to entirely eliminate the use of an axially driven shaft.

A further important object of my invention is the provision of novelly arranged bearings for supporting the crushing head, so that the crushing strains will always fall within the periphery of the bearings, thereby reducing the tendency of the head to tilt, even when the crushing is concentrated in the very top or bottom of the crushing chamber.

A still further object of my invention is to provide novel means for preventing or reducing the rotation of the crushing head during the gyration thereof, so as to bring about the effective and quick crushing of the rock.

A still further object of my invention is the provision of a novelly arranged reservoir for the lubricating oil directly in the frame or body of the crusher with a pump therein for circulating the oil to the bearings, and means also in said reservoir acting as a hydraulic brake for reducing the tendency of the head to rotate, the pump and brake being actuated by the operating mechanism for the crushing head.

A still further important object of my invention is the provision of means for detachably clamping and mounting the crushing mantle firmly upon the body portion of the crushing head and to provide novel means for detachably supporting the bowl upon the supporting frame.

With these and other objects in view, the invention consists in the novel construction, arrangement and formation of parts, as will be hereinafter more specifically described and claimed, and illustrated in the accompanying drawings:

In the drawings:

Figure 2, is a horizontal, sectional view through the mounting for the crushing head, the section being taken substantially on the line 2—2 of Figure 1, looking in the direction of the arrows.

Figure 3, is an enlarged detail vertical sectional view through the oil circulating pump and the hydraulic brake, the view also illustrating the mounting therefor.

Figure 4, is an enlarged fragmentary vertical sectional view through the lubricating oil circulating pump and the hydraulic brake, the view being taken substantially at right angles to Figure 3, and on the line 4—4 of Figure 3, looking in the direction of the arrows.

Figure 5, is an enlarged fragmentary, horizontal sectional view, taken through the hydraulic brake on the line 5—5 of Figure 3, looking in the direction of the arrows.

Figure 6, is a fragmentary, vertical sectional view taken through the hydraulic brake on the line 6—6 of Figure 3, looking in the direction of the arrows.

Figure 7, is a detail, horizontal sectional view, taken through the oil circulating pump on the line 7—7 of Figure 3, looking in the direction of the arrows.

Figure 8, is an enlarged fragmentary detail vertical sectional view taken through a part of the pump, the section being taken on the line 8—8 of Figure 7, looking in the direction of the arrows.

Figure 9, is an enlarged, fragmentary detail vertical sectional view through the pump taken on the line 9—9 of Figure 7, looking in the direction of the arrows, and illustrating the arrangement of the valves for the pump.

Figure 10, is a central vertical sectional view through a slightly modified form of the gyratory crusher, illustrating further means for stabilizing the crushing head.

Referring to the drawings in detail, wherein similar reference characters designate corresponding parts throughout the several views, the letter "C" generally indicates my improved gyratory crusher.

Figure 1:
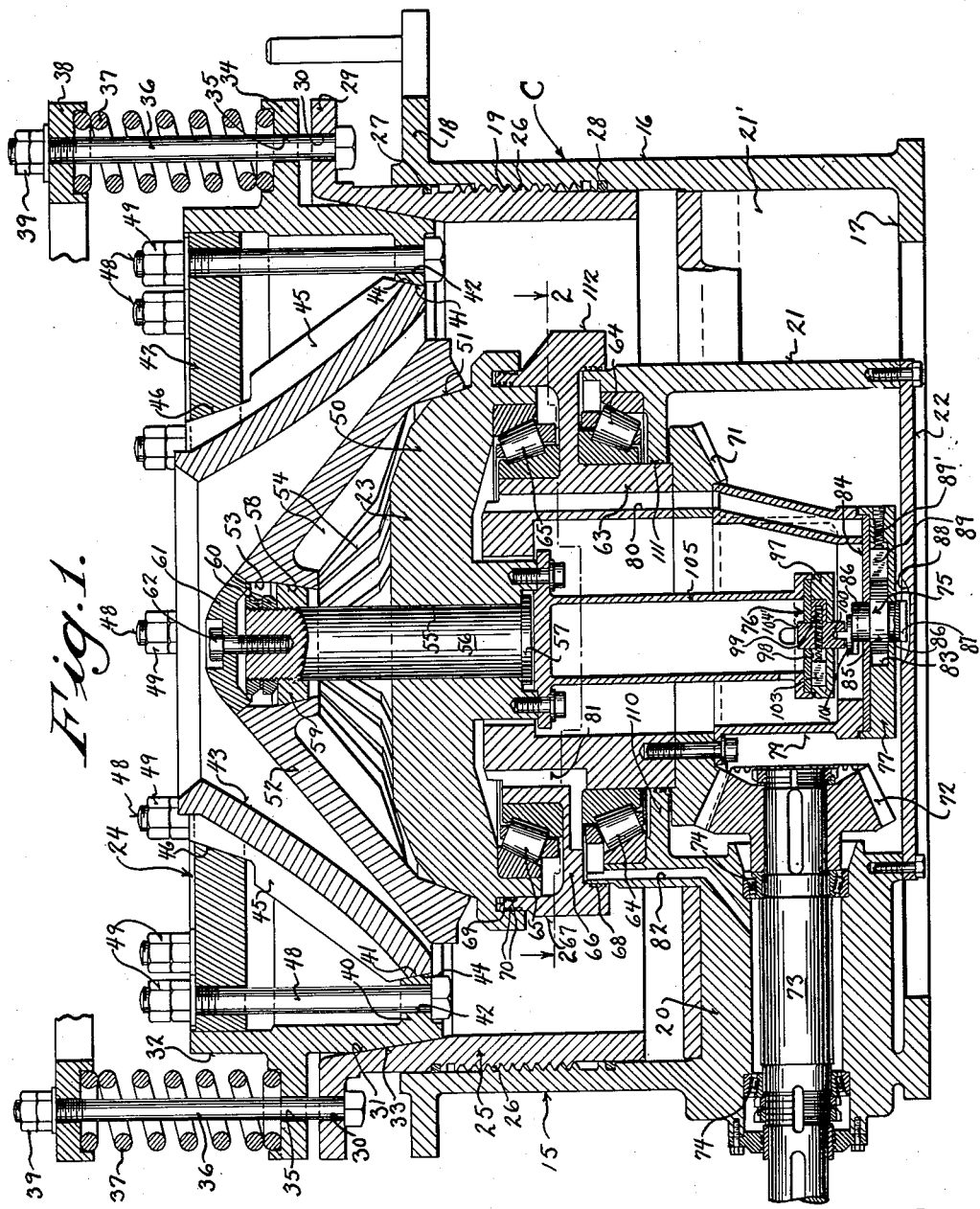
Figure 1, is a central, vertical sectional view through the improved gyratory crusher, the section being taken substantially on the line 1—1 of Figure 2, looking in the direction of the arrows.

The crusher "C" includes a substantially cylindrical base frame 15, and this frame is adapted to be anchored on a suitable foundation (not shown). The frame 15 includes the cylindrical side wall 16 having inturned base flange 17, for engagement with the support on which the crusher is placed. The upper end of the side wall 16 is provided with an outwardly extending annular flange 18. The interior of the side wall, adjacent to its upper ends, is provided with coarse screw threads 19, for a purpose which will later appear. Formed on the cylindrical side wall 16, adjacent to its lower end is a bearing sleeve 20, and this bearing sleeve 20 is radially disposed relative to the axial center of the frame and terminates short of the axial center of the frame. Formed on the inner end of the sleeve bearing 20, is a reservoir shell wall and bearing support 21, and this wall is rigidly connected to the frame 15 by radially extending webs 21'. This wall 21 detachably receives a bottom wall plate 22. The bottom wall 22 and the shell wall 21 form a reservoir for lubricating oil. It is to be noted that the reservoir is arranged centrally within the base frame, adjacent to the lower end thereof. This reservoir also forms a supporting part for the crushing head 23, which will be later described.

Mounted above the reservoir and the crushing head 23, is the bowl 24 for the rock to be crushed. This bowl is supported in a novel manner on the frame and is supported for adjustment toward and away from the crushing head. As illustrated, a heavy supporting ring 25, is provided for the bowl 24, and this ring is provided with exterior threads 26. The ring 25 is threaded into the frame 16 and the threads 26 engage the threads 19. In order to protect the threads 19 and 26 from rock dust and other debris, annular top and bottom sealing gaskets 27 and 28 can be provided. The extreme upper end of the supporting ring 25 is provided with an outwardly extending supporting flange 29. This flange is provided with a series of equidistantly spaced bolt holes 30, the purpose of which will also later appear. The inner wall of the supporting ring directly below the flange 29 is provided with a tapered bearing face 31, in which is fitted the crushing bowl 24. This allows for the tilting of the crushing bowl on the supporting ring 25, when the crushing strain exceeds a pre-determined value.

Now referring to the crushing bowl 24, the same includes an outer cylindrical body or wall 32. This body 32 has its outer surface adjacent to its lower end, provided with a tapered face 33, which engages the tapered face 31 of the supporting ring. Formed on the body 32, is an outwardly extending flange 34, which is disposed directly above the flange 29 on the supporting ring 25. This flange 34 is also provided with bolt holes 35. Bolts 36 extend through the bolt holes 30 and 35, and these bolts have coiled thereabout expansion springs 37. The lower ends of these springs fit in sockets or recesses formed in the flange 34. The upper ends of the springs all bear against a retaining ring 38. The ring 38 is slidably mounted upon the upper ends of the bolts 36. Nuts 39 are threaded on the bolts 36 down tight against the retaining ring 38. By adjusting the nuts 39, the tension of the springs 37 can be regulated. These springs 37 exert a continuous pressure down on the flange 34 and holds the crushing bowl 24 in place normally, against tilting movement, but allows the bowl to tilt, when the crushing strains exceed the tension for which the springs 37 are set. It is to be noted that the flange 29 of the supporting ring 25, can be provided with handles, so as to facilitate the turning of this ring on the base or main frame 15.

The wall or body 32 of the bowl adjacent to its extreme lower end is provided with a supporting wall or flange 40. This flange or wall 40, has its inner edge tapered inwardly to form a seat 41. This wall or flange 40 is also provided with bolt holes 42. Mounted centrally within the frame is the bowl proper or crushing shoe 43. The lower edge of the crushing shoe 43 is tapered downwardly and inwardly as at 44, to form a seat and this seat 44 fits snugly on the seat 41. The outer surface of the crushing shoe 43, at equi-distantly spaced points, is provided with strengthening ribs 45. The upper ends of the ribs are provided with tapered or wedge shaped seats 46, and these seats 46 receive the clamping ring or plate 47. Bolts 48 extend through the bolt holes 42, and then through the clamping ring 47, and have threaded thereon down tight against the clamping ring 47, nuts 49. By this arrangement, the clamping ring 47 can be drawn down tight against the ribs 45 of the crushing shoe 43, so as to firmly hold the bottom of the crushing shoe on its seat 41. Obviously, by removing the clamping plate 47, the crushing shoe 43 can be readily and immediately pulled out of the crusher.

Now, referring to the crushing head 23, the same includes the main body 50, having formed on its outer surface tapered seat 51, on which is detachably fitted the lower end of a crushing mantle 52. This mantle 52 covers the body 50, and is provided with an axial bore 53 at its upper end. The mantle is of a rugged nature and can be braced in any preferred way, such as by the use of interior bracing ribs 54. The body 50 of the crushing head 23 is also provided with an axial bore 55, and this bore receives a central shaft 56. The lower end of this shaft is provided with a head 57, which engages against the lower face of the body 50. The shaft 56 extends into the bore 53 of the mantle 52, and this bore 53 has formed therein a wedge seat 58 against which is fitted a clamping ring 59. The ring 59 is mounted on the shaft 56 and is firmly held down on the seat 58 against movement by adjusting and lock nuts 60. A cap 61 is drawn down tight against the upper end of the mantle 52, by a cap screw 62. This cap 61 closes the upper end of the bore 53 and is formed from hardened metal to withstand the rock, as the same is fed into the bowl 24.

Rotatably mounted upon the reservoir shell wall and bearing support 21 is a drive sleeve 63. A roller bearing is provided for the drive sleeve and this roller is concentric with the vertical axis of the crushing bowl 24 and the sleeve carries at its upper end a roller bearing 65 which is eccentrically disposed relative to the vertical axis of the crushing bowl 24. The body 50 is mounted upon this eccentric bearing 65, and upon rotation of the drive sleeve 63, the crushing head will be gyrated relative to the concave 43, of the crushing bowl 24. Particular attention is directed to the bearings 64 and 65, and it is to be noted that these bearings are of large enough diameter and are positioned in such a manner relative to the crushing head 23 that the line of resultant pressure on the crushing head will fall within the periphery of these bearings. This will effectively decrease the likelihood of the crushing head 23 tilting on its support.

In order to protect the bearings 64 and 65 from rock dust and other debris, the bearing sleeve 63 has formed thereon between the bearings an outwardly extending flange 66. The flange 66 in turn carries a peripheral collar 67. The collar at its lower end is provided with sealing rings or grooves 68, which engage the upper end of the shell wall 21. The lower edge of the body 50 of the crushing head 23, has formed therein a channel 69, which receives the upper edge of the collar 67. The upper edge of the collar is provided with sealing rings or grooves 70, which are adjacent to the walls of this channel 69. The channel 69 and the upper end of the collar 67 are arranged so as to permit the desired gyratory action of the crushing head.

In order to bring about the proper driving of the sleeve 63, the lower end thereof has securely fastened thereto a beveled ring gear 71. Meshing with the ring gear 71 is a beveled drive gear 72. The gear 72 is keyed or otherwise fastened to the drive shaft 73. The drive shaft 73 extends through the drive sleeve 20 and is supported by suitable roller bearings 74. The shaft 73 is driven from any preferred type of prime mover.

Means is provided for lubricating the bearings and for producing a hydraulic brake, so as to prevent the rotation of the crushing head 23. The lubricating means includes a pump 75 and the braking means includes a hydraulic pump brake 76.

The lubricating pump 75 is of the rotary type and includes a pump housing 77. This pump housing is fastened by means of screws 78 to the lower end of a supporting collar 79. The upper end of this collar is securely fastened to the lower end of the drive sleeve 63, and in effect forms a continuation thereof. The collar 79, the gear 71 and the drive sleeve 63 are well provided with an oil delivering passageway 80. The upper end of this passageway 80 leads out through the upper end of the bearing sleeve 63, so that oil from this passageway can freely flow over the roller bearing 65. Also leading through the sleeve 63 is a second oil passageway 81, and oil flowing around the top bearing 65 will enter the passageway 81 and flow around the lower bearing 64. The bearing sleeve 20 for the shaft 73 and the shell wall 21 has formed therein an oil passageway 82, and this passageway leads to the interior of the bearing sleeve 20, so that the bearing 74 will be effectively lubricated. In fact, this passageway 82 forms a return for the oil to the reservoir. The pump 75 is located directly in this reservoir adjacent to the lower end thereof and the pump casing 77 is rotated in said reservoir through its connection (collar 79) with the gear 71.

The pump casing 77 is in the nature of a block and the same has formed therein a pump chamber 83. A disc 84 is utilized for closing the upper end of this chamber. Eccentrically mounted within the pump chamber 83 is the pump body 85, which would normally constitute the rotor of the pump. In the present instance, the pump body 85 is held against rotation during the turning movement of the pump casing 77. This is accomplished by providing the pump body 85 with stub shafts 86 received respectively in the casing 77 and the closure disc 84. The lower stub shaft 86 is provided with a key 87 received in a keyway 88, formed in the upper face of the bottom wall 22 of the reservoir. The pump casing 77 carries a sliding vane 89 and this vane is normally urged into engagement with the pump body 85 by an expansion spring 89'.

In order to bring about the operation of the pump during rotation of the pump casing in either direction, the pump casing on each side of the vane 89, is provided with a set of inlet and outlet ports 90 and 91. The outlet ports 91 of each set communicate with the passageway 80. The inlets 90 are controlled respectively by spring pressed check valves 92. The check valves 93 control the flow of oil from the pump chamber to the passageway 81. It can be seen that the check valves 93 fit upon seats 94 which communicate with chamber 83 by means of passageway 96.

Considering that the pump casing 77 is being rotated in a clockwise direction (see Figure 7), the oil will be taken into the pump chamber 83 through the passageway 96, on the left hand side of the vane 89, and the check valve 92 on the left hand side will be unseated by the suction set up by the rotation of the pump casing in conjunction with the stationary pump body 85 and the check valve 93 on the left hand side will be held on its seat by this suction. The set of valves in the right hand side of the vane 89, will operate in the following manner: oil will be forced out of the chamber 83 through rotation of the pump casing 77, and the body 85 through the passageways 96 on the right hand side of the vane and this flow of oil will force the valve 92 on the right hand side of its seat and will lift the valve 93 on the right hand side off its seat. This will bring about the continuous flow of oil up through passageway 80. If the crushing head is rotated in a retrograde direction, the sets of valves will function just opposite to that described.

The hydraulic brake pump 76 includes a casing 97 mounted directly above the pump 75. The casing 97 is provided with a central chamber 98 in which is eccentrically mounted the brake body 99. This brake body 99 is slidably connected by means of a keyway 100, with a cross-head 101. This cross-head 101 is slidably connected to the upper stub shaft 86 of the pump body 85 by a keyway 102. It is to be noted that the keyway 102 is at direct right angles to the keyway 100. This allows the brake body 99 to move in two directions relative to the pump body 85. The brake body 99 carries a radially extending spring pressed vane 103 and this vane is normally urged against the wall of the brake chamber 98. Attention is called to the fact that the casing 97 can turn relative to the brake body 99 and that the body 99 is provided with bottom and top stub shafts 104 and 104', which are mounted in bearings in the casing 97. The casing 97 is carried directly by the crushing head 23 and is connected thereto by a depending sleeve 105. The brake body on each side of the spring pressed vane 103 is provided with radially extending passageways 106 and 107. The outer ends of these passageways 106 and 107 communicate with the brake chamber 98 on each side of the spring pressed vane 103, and the inner ends of these passageways 106 and 107 communicate with the reservoir by means of downwardly extending passageways 108 and 109, which open out through the lower end of the bottom stub shaft 104. The brake casing 97 is gyrated with the crushing head 23, by the connecting sleeve 105 and the oil on each side of the vane 103 tends to act against said vane. If the brake body 99 and its vane 103 is held against rotation (through its connection with the pump body 85), the connecting sleeve 105 and consequently the crushing head 23 will be held against rotation. If the rotative force of the crushing head and the sleeve 105 overcomes the oil pressure and the brake housing starts to rotate, then oil will be pumped in and expelled from the casing on the opposite sides of the vane, and this pumping action will at all times act against said rotative force and tend to decrease the rotation of the head. Attention is directed to the small diameters of the passageways 106 and 107 and it is obvious that the flow of oil through these passageways is restricted. At the start, the brake chamber 98 is filled with oil, due to the fact that this hydraulic brake is immersed in the oil of the reservoir.

In order to further aid in protecting the bearings 64 and 65 against debris, the reservoir shell wall 21 has formed on its inner surface an inwardly extending annular flange 110. This flange carries sealing rings 111, which engage against the drive sleeve 63.

In order to reduce vibration the drive sleeve 63 is counter-balanced. This is accomplished by thickening the periphery of the collar 67, as at 112, to increase the mass on one side. The weight of the collar is increased opposite the side or the crushing point of contact of the crushing head with the bowl.

From the foregoing description, the operation of the gyratory crusher will be apparent, but attention is directed to the fact that the sleeve 63 is driven through the medium of the shaft 73. The rotation of this sleeve and its collar 67 and the eccentric bearing 65 will bring about the desired gyratory action of the crushing head 23. During the rotation of the head the pump 75 will be operated therewith to effectively lubricate the bearings and at the same time, the hydraulic brake 76 will reduce the tendency of the crushing head 23 to rotate with respect to the drive sleeve.

In certain instances, it may be desirable to further stabilize the crushing head 23 and to further prevent any tendency of this head to tilt. This can be easily accomplished and in Figure 10, I have illustrated a slightly modified form of my invention with the additional stabilizing device incorporated therewith. In this form of my invention the drive sleeve 63 is provided with a depending tubular extension 113. The tubular extension has connected directly thereto by bolts 114, the pump 75. The pump casing 77 and a wall 115 formed on the oil reservoir is provided with roller bearings 116. This roller bearing connection between the lower end of the sleeve 63 and the frame of the crusher forms an effective means for stabilizing the lower end of the drive sleeve 63, and consequently the head 23 carried by the sleeve is prevented from tilting. An additional bearing 117 can also be provided and this bearing can be placed between the tubular extension 113 of the sleeve 63 and the lower end of the central shaft 56. In this instance, the central shaft 56 is extended directly downwardly toward the pump 75 and terminates directly above said pump. The shaft extension then has secured directly thereto the hydraulic brake 76. It is to be also understood that in this form of my invention the periphery of the collar 67 carried by the drive sleeve 63 is increased in weight opposite the side of the crushing point of contact of the crushing head with the bowl, as at 112.

While I have shown the axis of the crushing head 23 parallel with the axis of the drive sleeve 63, it is to be understood that the axis of the head can be inclined relative to the axis of the sleeve.

Changes in details may be made without departing from the spirit or scope of my invention, but what I claim as new is:

1. In a gyratory crusher, a frame, a bowl supported on the upper end of said frame having a crushing shoe, a crushing head disposed in said shoe, means for gyrating said head including a drive sleeve, means for rotating said sleeve, means including an annular bearing for supporting the sleeve on the frame, means permitting free rotation of the sleeve relative to the crushing head including a bearing between the sleeve and head eccentrically disposed relative to the vertical axis of the bowl, and means for sealing said bearings against debris, including an outwardly extending flange on said sleeve arranged between said bearings, a collar on the periphery of the flange extending above and below the flange, the lower portion of the collar over-hanging a part of the frame, sealing means between the collar and said part of the frame, and sealing means between the collar and the crushing head.

2. In a gyratory crusher, a frame, a bowl supported on the upper end of the frame having a crushing shoe, a gyratory crushing head in said shoe, means for gyrating said head including a drive sleeve disposed below the head, means for rotating said sleeve, means including a bearing for rotatably supporting the sleeve on a part of the frame, the sleeve being freely rotatable relative to said head, a bearing between said head and sleeve eccentrically disposed relative to the vertical axis of the bowl, and means for sealing the bearing connection between the sleeve and a part of the frame and between the sleeve and said crushing head, including an outwardly extending flange on said sleeve located between the bearings, a collar on the periphery of the flange extending above and below the flange, sealing means between the lower end of the collar and the part of the frame supporting the first mentioned bearings, said head having a groove in its lower face receiving the upper end of the collar, and sealing means between a wall of the groove and the collar.

3. In a gyratory crusher, a frame, a bowl supported on the upper end of the frame having a crushing shoe, a gyratory crushing head in said shoe, means for gyrating said head including a drive sleeve disposed below the head, means for rotating said sleeve, means including a bearing for rotatably supporting the sleeve on the part of the frame, the sleeve being freely rotatable relative to said head, a bearing between said head and sleeve eccentrically disposed relative to the vertical axis of the bowl, and means for sealing the bearing connection between the sleeve and a part of the frame and between the sleeve and said crushing head, including an outwardly extending flange on said sleeve located between the bearings, a collar on the periphery of the flange extending above and below the flange, sealing means between the lower end of the collar and the part of the frame supporting the first mentioned bearings, said head having means in its lower face for receiving the upper end of the collar.

4. In a gyratory crusher, a frame, a bowl supported on the upper end of said frame, a gyratory crushing head arranged in said bowl, means for gyrating said head including a drive sleeve, means for rotating said sleeve, means for rotatably supporting the sleeve on a part of the frame, a bearing connection between the sleeve and said head eccentrically disposed relative to the vertical axis of the bowl, said sleeve being freely rotatable relative to said head, means for lubricating the bearings, including an oil reservoir in said frame and a pump located in said reservoir, said pump embodying a casing, means securing the casing to the sleeve for rotation therewith, and a pump body eccentrically mounted in said casing and means for holding the pump body against rotation.

5. In a gyratory crusher, a frame, a bowl supported on the upper end of said frame, a gyratory crushing head arranged in said bowl, means for gyrating said head including a drive sleeve, means for rotating said sleeve, means for rotatably supporting the sleeve on a part of the frame, a bearing connection between the sleeve and said head eccentrically disposed relative to the vertical axis of the bowl, said sleeve being freely rotatable relative to said head, means for lubricating the bearings including an oil reservoir in said frame and a pump located in said reservoir, said pump embodying a casing, means securing the casing to the sleeve for rotation therewith, and a pump body eccentrically mounted in said casing and means for holding the pump body against rotation, and means for preventing rotation of the head relative to the bowl and frame incident to the rotation of the sleeve including a hydraulic brake located in said reservoir, said hydraulic brake including a casing connected with the head for movement therewith, a pump body in said brake casing and means coupling the brake body with the pump body.

6. In a crusher, a crushing head, including a body having an outwardly flared, tapered seat on its periphery, a replaceable mantle detachably fitted upon said body and resting upon said seat, means holding the mantle upon the seat including an axially disposed shaft carried by said body and extending above the same the central portion of said mantle having a bore receiving the upper end of the shaft, said bore being also provided with a tapered seat, a tapered clamping plate slidably mounted in said bore carried by said shaft for movement tight against the tapered seat of the bore, a cap for closing said bore extending over the shaft, and means detachably securing the cap in place.

7. In a crusher, a crushing head including a body having an outwardly flared, tapered seat on its periphery, a detachable mantle fitted upon said body and resting upon said seat means holding the mantle upon the seat including an axially disposed shaft carried by said body and extending above the same, the central portion of said mantle having a bore receiving the upper end of the shaft, said bore being also provided with a tapered seat, a tapered clamping plate threaded on said shaft against the tapered seat of the bore, a cap for closing said bore, and means securing the cap in position.

8. In a gyratory crusher, a frame, a bowl supported on the upper end of said frame having a crushing concave, a crushing head disposed in said concave, means for gyrating said head including a drive sleeve, means for rotating said sleeve, means including an annular bearing for supporting the sleeve on the frame, means permitting free rotation of the sleeve relative to the crushing head including an eccentric bearing between the sleeve and head, and means for sealing said bearings against debris, including an outwardly extending flange on said sleeve arranged between said bearings, a collar on the sleeve over-hanging a part of the frame, sealing means between the collar and said part of the frame, and sealing means between the collar and the crushing head, said collar being increased in mass on the side thereof opposite to the crushing side of the head sufficient to counter-balance the eccentric mass of said head.

9. In a rock crusher, a frame, a bowl including an open body detachably mounted upon the frame having at its lower end an inwardly extending downwardly tapered seat, a crushing shoe fitted within said open body having radially extending strengthening ribs on its outer face, the lower end of the crushing shoe including said ribs being tapered and fitted in said seat, the upper end of the crushing shoe including said ribs being tapered in the opposite direction from the taper of the seat, a horizontally disposed clamping plate slidably associated with the body and engaging the tapered upper portion of the crushing shoe and its ribs, and means for detachably and adjustably holding the plate in position against said ribs.

ARTHUR W. LIPPMANN.

REFERENCES CITED

The following references are of record in the file of this patent:

UNITED STATES PATENTS

| Number | Name | Date |
|---|---|---|
| 1,031,083 | Newhouse | July 2, 1912 |
| 1,083,283 | Kelly | Jan. 6, 1914 |
| 1,145,929 | Smith | July 13, 1915 |
| 1,355,922 | Smith et al. | Oct. 19, 1920 |
| 1,507,970 | Lazier | Sept. 9, 1924 |
| 1,592,312 | Symons | July 13, 1926 |
| 1,592,313 | Symons | July 13, 1926 |
| 1,597,207 | Molander | Aug. 24, 1926 |
| 1,691,553 | Rumpel | Nov. 13, 1928 |
| 1,837,102 | Bernhard | Dec. 15, 1931 |
| 1,953,472 | Fahrenwald | Apr. 3, 1934 |
| 2,052,706 | Guest | Sept. 1, 1936 |
| 2,079,882 | Traylor | May 11, 1937 |
| 2,185,528 | Stevens | Jan. 2, 1940 |
| 2,310,737 | Gruender | Feb. 9, 1943 |
| 2,358,038 | Symons | Sept. 12, 1944 |

FOREIGN PATENTS

| Number | Country | Date |
|---|---|---|
| 432,848 | Great Britain | Aug. 2, 1935 |